United States Patent
Qu et al.

(10) Patent No.: US 9,538,155 B2
(45) Date of Patent: Jan. 3, 2017

(54) DECODING AND DISPLAY OF HIGH DYNAMIC RANGE VIDEO

(71) Applicant: Dolby Laboratories Licensing Corporation, San Francisco, CA (US)

(72) Inventors: Sheng Qu, San Jose, CA (US); Samir Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 181 days.

(21) Appl. No.: 14/548,906

(22) Filed: Nov. 20, 2014

(65) Prior Publication Data
US 2015/0156469 A1 Jun. 4, 2015

Related U.S. Application Data (60) Provisional application No. 61/938,823, filed on Feb. 12, 2014, provisional application No. 61/911,943, filed on Dec. 4, 2013.

(51) Int. Cl.
*H04N 9/87* (2006.01)
*H04N 11/24* (2006.01)
(Continued)

(52) U.S. Cl.
CPC ............ *H04N 9/8715* (2013.01); *G09G 5/006* (2013.01); *G09G 5/36* (2013.01); *H04N 11/002* (2013.01);
(Continued)

(58) Field of Classification Search
CPC .............................. H04N 9/8715; G09G 5/006
See application file for complete search history.

(56) References Cited

U.S. PATENT DOCUMENTS

2013/0314495 A1* 11/2013 Chen .................. H04N 13/0048
348/43

FOREIGN PATENT DOCUMENTS

WO  2013/086169  6/2013
WO  2014/107255  7/2014
(Continued)

OTHER PUBLICATIONS

HDMI Licensing, LLC, "High-Definition Multimedia Interface", specification version 1, 4b, Oct. 11, 2011.

*Primary Examiner* — Dave Czekaj
*Assistant Examiner* — Nam Pham
(74) *Attorney, Agent, or Firm* — Konstantinos Konstantinides (57) ABSTRACT

Novel methods and systems for decoding and displaying enhanced dynamic range (EDR) video signals are disclosed. To accommodate legacy digital media players with constrained computational resources, compositing and display management (DM) operations are moved from a digital media player to its attached EDR display. On a video receiver, base and enhancement video layers are decoded and multiplexed together with overlay graphics into an interleaved stream. The video and graphics signals are all converted to a common format which allows metadata to be embedded in the interleaved signal as part of the least significant bits in the chroma channels. On the display, the video and the graphics are de-interleaved. After compositing and display management operations guided by the received metadata, the received graphics data are blended with the output of the DM process and the final video output is displayed on the display's panel.

16 Claims, 6 Drawing Sheets

(51) Int. Cl.
*H04N 13/00* (2006.01)
*H04N 21/2343* (2011.01)
*H04N 21/434* (2011.01)
*H04N 21/4363* (2011.01)
*G09G 5/36* (2006.01)
*H04N 21/4402* (2011.01)
*G09G 3/00* (2006.01)
*G09G 5/00* (2006.01)

(52) U.S. Cl.
CPC ...... *H04N 13/0059* (2013.01); *H04N 13/0066* (2013.01); *H04N 21/234327* (2013.01); *H04N 21/4341* (2013.01); *H04N 21/4344* (2013.01); *H04N 21/43635* (2013.01); *G09G 3/003* (2013.01); *G09G 5/003* (2013.01); *G09G 5/005* (2013.01); *G09G 2340/0428* (2013.01); *G09G 2340/10* (2013.01); *G09G 2352/00* (2013.01); *G09G 2370/04* (2013.01); *G09G 2370/12* (2013.01); *H04N 21/440227* (2013.01)

(56) References Cited

FOREIGN PATENT DOCUMENTS

| | | |
|---|---|---|
| WO | 2014/130343 | 8/2014 |
| WO | 2014/163793 | 10/2014 |
| WO | 2014/176019 | 10/2014 |

\* cited by examiner

DECODING AND DISPLAY OF HIGH DYNAMIC RANGE VIDEO

CROSS REFERENCE TO RELATED APPLICATIONS

This patent application claims the benefit of priority to U.S. Provisional Application Ser. No. 61/911,943, filed on Dec. 4, 2013, "Decoding and Display of High Dynamic Range Video," and U.S. Provisional Application Ser. No. 61/938,823, filed on Feb. 12, 2014, "Decoding and Display of High Dynamic Range Video," each of which is incorporated herein by reference in its entirety.

TECHNOLOGY

The present invention relates generally to video images. More particularly, an embodiment of the present invention relates to the decoding and display of high dynamic range video.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable by short-term adaptation though a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

Most consumer desktop displays support luminance of 200 to 300 $cd/m^2$ or nits. Most consumer HDTVs range from 300 to 1000 $cd/m^2$. Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more). In general, the methods of the present disclosure relate to any dynamic range higher than SDR.

To support backwards compatibility with legacy playback devices as well as new HDR or ultra-high definition (UHD) display technologies, multiple bitstream layers may be used to deliver UHD and HDR (or EDR) video data from an upstream device to downstream devices. Given such a multi-layer stream, legacy decoders may use one set of layers to reconstruct an HD version of the content with lower dynamic range (LDR) or standard dynamic range (SDR). Advanced decoders may use a second set of layers to reconstruct an HD or UHD EDR version of the content to render it on more capable displays. An example of such system was described in U.S. Provisional Patent Application 61/882,773, to be referred from now on as the '773 Application, filed on Sep. 26, 2013, titled "Backward-compatible coding for ultra-high definition signals with enhanced dynamic range," (filed also as PCT Application Ser. No. PCT/US2013/073085, on Dec. 4, 2013) which is incorporated herein by reference in its entirety.

Processing in an EDR receiver may be considered to include two major components: a) decoding and blending the two stream layers to generate a decoded EDR video signal, and b) performing display management (e.g., tone and gamut mapping) on the decoded EDR video signal to adapt it for optimum display onto the target EDR display. These image-dependent operations may be assisted or controlled by EDR metadata generated by the source of the EDR content and multiplexed into the coded EDR bitstream.

In some use cases, existing set-top boxes may not have enough processing power to perform image-content dependent display management to yield the best possible video quality performance. As appreciated by the inventors here, improved techniques for the decoding and display of EDR video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for the decoding and display of EDR video signals are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the decoding, and display of images with high or enhanced dynamic range. In an embodiment, a digital media player receives a coded, layered bitstream, of enhanced dynamic range (EDR) to be displayed on an EDR display. To accommodate legacy media players with limited computational resources, some of the decoding operations are moved from the player to it attached EDR display. A video decoder on the digital media player extracts and decodes a base layer, an enhancement layer, and metadata from the coded EDR stream. It then converts the two layers and input graphics into a common video format suitable for embedding the metadata. In an embodiment, 8-bit video and graphics data are converted into a common 12-bit YCbCr 4:2:2 format. The converted signal layers and the graphics are interleaved and the interleaved signal and the embedded metadata are transmitted to an EDR display using a standard interface (e.g., HDMI). On the display, the signal layers and the graphics are de-interleaved. The two signal layers are combined together to generate an EDR signal, which is adapted to be displayed on the display's panel using a display management process guided by the received metadata. The received graphics data are blended with the output of the DM process and the final video output is displayed on the display's panel.

In an embodiment, the interleaved 12-bit YCbCr data are transmitted to the display using an 8-bit, RGB, 4:4:4, HDMI format.

In another embodiment, a video decoder on the digital media player extracts and decodes a base layer, an enhancement layer, and metadata from the coded EDR stream. It then composes a 2D EDR signal which is blended with metadata and alpha blend values. Input graphics and the blended 2D EDR signal are re-formatted as 3D video data and are transmitted to an EDR display using a standard interface for 3D video (e.g., HDMI). On the display, the EDR signal, display metadata, and the graphics are decoded. The EDR signal is adapted to be displayed on the display's panel using a display management process guided by the received metadata. The received graphics data are blended with the output of the DM process and the final video output is displayed on the display's panel.

Delivery of EDR Signals

Layered Decoding

Existing display and play-back devices, such as HDTVs, set-top boxes, or Blu-ray players, typically support signals of up to 1080p HD resolution (e.g., 1920×1080 pixels at 60 frames per second). For consumer applications, such signals are now typically compressed using a bit-depth of 8 bits per pixel per color component. Because of the 8-bit depth and the corresponding low dynamic range, such signals are typically referred to as signals with standard dynamic range (SDR).

As new television standards are being developed, such as Ultra-High Definition (UHD), it may be desirable to encode signals with enhanced resolution and/or enhanced dynamic range while allowing legacy decoders to still be able to receive and decode a version of the same signal with lower dynamic range (e.g., SDR). An example of such a system is described in U.S. Provisional Patent Application with Ser. No. 61/894,198 (to be referred as the '198 Application), filed on Oct. 22, 2013, titled "Distribution of multi-format high dynamic range video using layered coding," by G-M Su et al., and incorporated herein by reference in its entirety (filed also on Feb. 14, 2014 as PCT Application Ser. No. PCT/US2014/016544).

Figure 1:
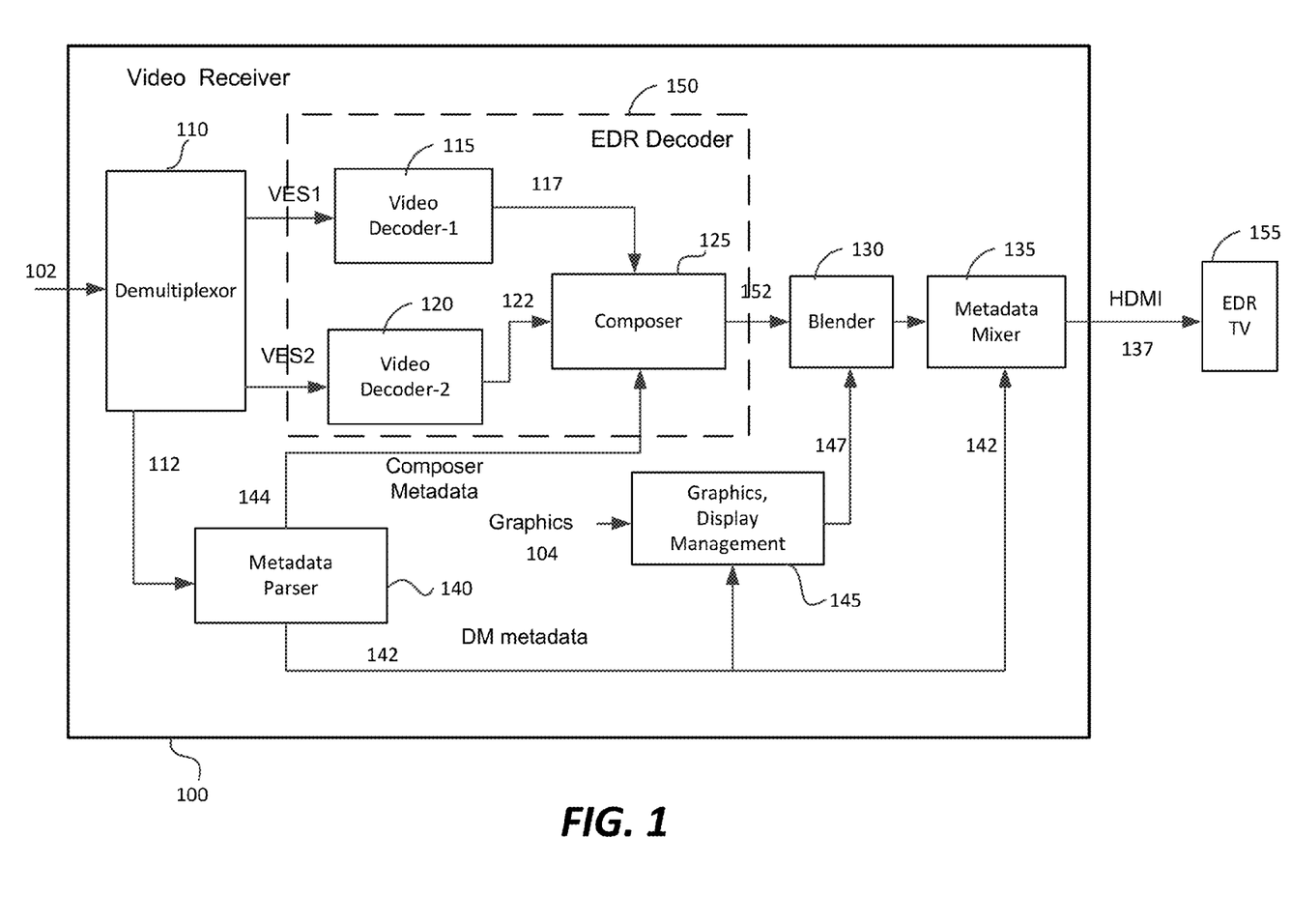
FIG. 1 depicts an example implementation of an EDR video receiver according to an embodiment of the present invention.

Given a layered signal delivery format, FIG. 1 depicts an embodiment of an example implementation of an EDR video receiver (100) in a digital media player for generating an EDR output signal for a target display (155). As used herein, the term 'digital media player' denotes any device that receives digital media content (e.g., video, pictures, music, and the like) to play it back on a television, monitor, or other display. Examples of digital media players include set-top boxes, gaming machines (e.g., an Xbox), general purpose personal computers, tablets, or dedicated digital media receivers, such as the Apple TV or the Roku box. As depicted in FIG. 1, upon receiving a coded video bitstream (102), a demultiplexor (110) may generate a coded base layer (BL) stream (VES1), a coded enhancement layer (EL) stream (VES2), and metadata (112). As defined herein, the term "metadata" or "ancillary data" may relate to any auxiliary information that is transmitted as part of the coded bit-stream and assists a decoder to render a decoded image. Such metadata may include, but are not limited to, information as: color space or gamut information, dynamic range information, tone mapping information, or other encoder-related operators.

Video decoders (115) and (120) receive the coded bit streams (VES1, VES2) and generate uncompressed video signals (117) and (122). These decoders may comprise different hardware decoders or they may be implemented using a single decoder. In an embodiment, without limitation, video decoder-1 may be an AVC (or H.264) video decoder and video decoder-2 (120) may be an AVC or HEVC video decoder. In other embodiments, video decoders (115, 120) may be based on the MPEG-2, MPEG-4, HEVC, VC-1, VP8, VP9, or any other suitable video compression format. In an embodiment, without limitation, video signals (117) and (122) may be decoded in the YCbCr 4:2:0 format. As used herein, the term 'video format' may relate to any information related to the representation of an image or video signal, such as resolution, bit depth, color format representation (e.g., RGB or YCbCr), chroma sub-sampling (e.g., 4:2:0, 4:2:2, or 4:4:4), frame rate, and the like.

Composer (125) receives the decoded BL (117) and EL (122) signals and combines them to generate a decoded EDR stream (152). For example, as discussed in the '198 Application, in an embodiment, the composer (125) may use a predictor (not shown) to predict an EDR signal from the received BL signal (117), which is then added to the EL signal (122) to generate the output EDR signal (152). The composer's operation may be guided by composer metadata (144), parsed through metadata parser (140) from metadata (112) embedded in the received bit stream (102). Such composer metadata may include such parameters as video coding parameters, filtering parameters, and the like. In some embodiments, composer metadata may also be part of VES1 or VES2 streams; hence they could be extracted by the video decoders (115, 120) instead. In an embodiment, EDR signal (152) may be formatted in an HD 12-bit 4:2:2 or 4:4:4 format.

For graphics processing (e.g., menu overlays) and in order to best match the display characteristics of the target display (155), EDR decoding (150) is typically followed by a series of display management and graphics related operations, such as those depicted in FIG. 1. As described in U.S. Provisional Patent Application 61/810,104, to be referred to as the '104 Application, filed on Apr. 9, 2013, titled "Display management for high dynamic range video," (filed also on Feb. 13, 2014 as PCT Application PCT/US2014/016304) which is incorporated herein by reference in its entirety, the display management process (145) may be guided by a variety of DM metadata (142) embedded in the received video bitstream (102). Such metadata may include parameters related to the source reference display, video-related metadata, or other metadata that may relate to the color grading processes used to generate the original data.

Graphics and video data are blended in blender (130), and display management (DM) metadata maybe embedded into each video frame using a metadata mixer (135). In an embodiment, the blending in mixer (135) may be done so that the output data (137) is compatible to be transmitted to the display (155) using a standard signal interface, such as HDMI. One example of such metadata mixing is described in U.S. Provisional Application 61/815,080, to be referred to as the '080 Application, filed on Apr. 23, 2013, and titled "Transmitting display management metadata over HDMI," (filed also on Apr. 7, 2014 as PCT Application PCT/US2014/033129) which is incorporated herein by reference in its entirety. Another example of metadata blending is described in U.S. Provisional Application 61/886,026, to be referred to as the '026 Application, filed on Oct. 2, 2013, and titled "Transmitting display management metadata over HDMI," (filed also on Sep. 30, 2014, as PCT Application PCT/US2014/058260) which is incorporated herein by reference in its entirety. Hence, output signal (137) may comprise blended video (152) and graphics (104) data, and DM metadata (142).

As described in the '026 and '080 Applications, in some embodiments, metadata (142) may be coded in the LSB of the chroma pixel values of a 12-bit YCbCr 4:2:2 signal. In some other embodiments, for digital media players which support only an 8-bit HDMI interface, the video data and the metadata may be mixed to appear as 8-bit RGB 4:4:4 data.

First Embodiment of Simplified Media Receiver

Figure 2A:
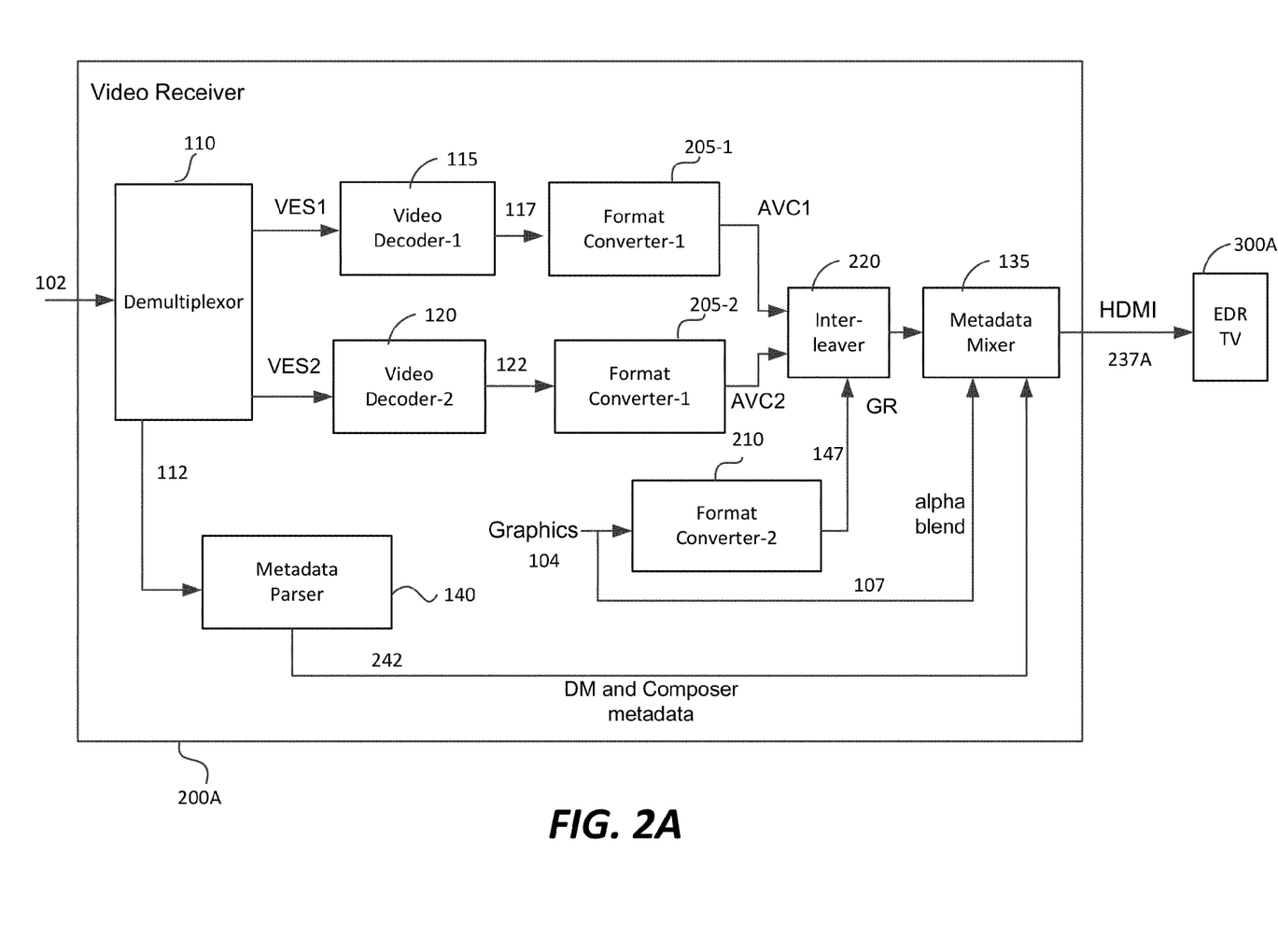
FIG. 2A and FIG. 2B depict example implementations of simplified EDR video receivers according to embodiments of the present invention.

Due to the complexity of the composer (125) and the display management (145) operations, legacy media players may not have enough computational power to support EDR decoding as depicted in FIG. 1, hence an alternative implementation is desirable. Such an embodiment is depicted in FIG. 2A. As depicted in FIG. 2A, the decoding of the two video layers (VES1, VES2) is still performed by the video receiver (200A); however, the composer and display management operations will now be performed on an EDR TV (e.g., 300A).

Output signal (237A) now includes graphics (104) and two sets of decoded video signals (117 and 122), hence, compared to receiver (100), receiver (200A) requires a higher transmission rate of data between its digital media player and the TV (300A). To accommodate the new transfer rate requirements, as depicted in FIG. 2A, some additional processing is required. In an embodiment, consider, without loss of generality, a video source signal (102) coded at 24 frames per second (fps), which is a typical frame rate of distributed movie releases in the U.S. Assuming that most TVs can accept video signals over HDMI at 60 fps, then, in an example embodiment, the available bandwidth may be subdivided as follows: 24 fps for each of the video streams and 12 fps for the graphics (104). The three streams can be interleaved by interleaver (220) in a variety of ways. For example, in an embodiment, they can be interleaved as video layer1 (AVC1, 117), followed by video layer 2 (AVC2, 122), followed by graphics (GR, 147). Note that since graphics is half the frame-rate of the two video layers, the graphics frame is inserted once every two sets of video layer 1 and video layer 2 frames.

In some embodiment, depending on the color format of the decoded video signals, as depicted in FIG. 2A, additional format conversion may be required. For example, given video signals (117, 122) in 8-bit YCbCr 4:2:0 formats, format converters (205) may convert them into a 12-bit 4:2:2 format using pixel replication or any other known chroma up-sampling techniques. 8-bit data may be converted to 12-bit data by simply appending four zero bits (or any other known 0-bit sequence) to the 8-bit data. For graphics (104), format converter-2 (210) is used to also translate the input graphics data from the original format (e.g., 8-bit YCbCr 4:4:4) to the desired output format (e.g., 12-bit YCbCr 4:2:2). For example, 8-bit 4:4:4 data may be first down-sampled to generate 8-bit 4:2:2 graphics data. Then, four zeros or a known 4-bit sequence may be appended to the 8-bit data to generate a 12-bit 4:2:2 graphics stream (147).

Display management and composer metadata (242), together with graphics related metadata (107) (e.g., alpha blend values) may be blended together (e.g., using the techniques presented in the '026 and '080 Applications) with the output of the interleaver (220) by metadata mixer (135) to generate the final, HDMI-compliant signal (237A) (e.g., as an 8-bit RGB 4:4:4 stream or a 12-bit YCbCr 4:2:2 stream). To facilitate decoding of this stream by the TV (300A), in addition to the protocols described in the '026 and '080 Applications, the HDMI control stream may include some additional flags, such as:

An indicator that describes that the stream complies to this specific mode of operation Indicators that the stream includes composer metadata and graphics alpha blend values An indicator of the frame type (e.g., AVC1, AVC2, or GR)

Support for other input frame rates is also possible. For example, if the input video signal is coded at 48 fps, in an embodiment, the total output frame rate may be set at 120 fps, which allows transmitting graphics (104) at 24 fps. Similarly, if the input video signal is coded at 25 fps, in another embodiment, the total output frame rate may be set at 100 fps, which allows transmitting graphics (104) at 50 fps. If the content is coded in other frame rates, practitioners skilled in the art will appreciate that frame rate conversion techniques as known in the art may be also be applied to both the video receiver (200A) and the TV (300A) so that the total frame rate of output signal (237A) is within the total frame rate allowable by the interface standards between the digital media player and a target display.

Figure 3A:
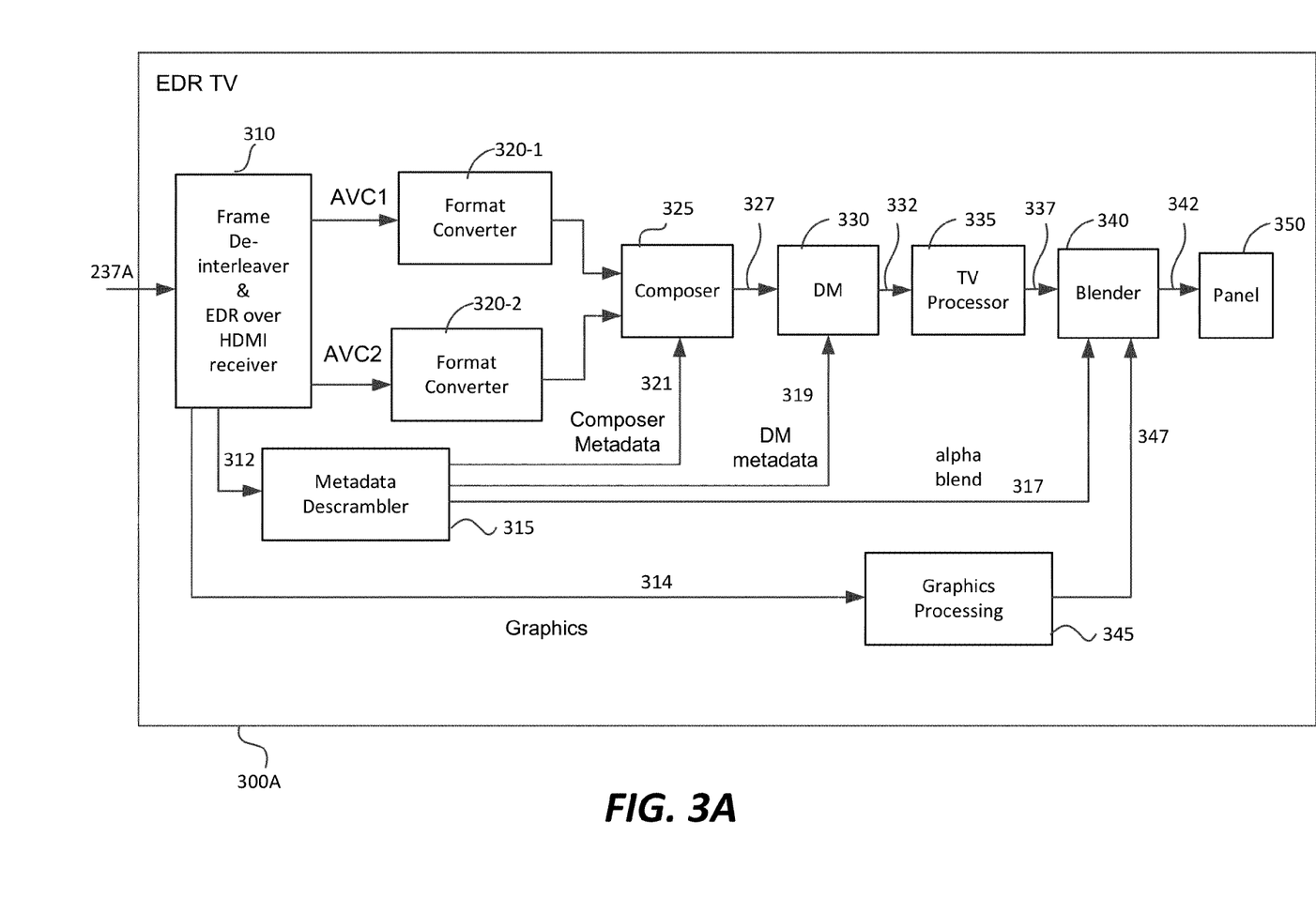
FIG. 3A and FIG. 3B depict example implementations of television sets for displaying EDR content according to embodiments of the present invention.

Given the simplified video receiver (200A), FIG. 3A depicts an example implementation of a corresponding EDR TV, according to an embodiment. As depicted in FIG. 3A, upon receiving input (137), an HDMI receiver and frame de-interleaver (310) will extract the metadata (312), the video data for the two layers (AVC1, AVC2), and the graphics overlay data (314). In its operation, EDR over HDMI receiver (310) will be assisted by the various flags embedded in the stream, as discussed previously and as described in the '026 and '080 Applications. Metadata descrambler (315) may also separate all incoming metadata (312) into specific categories, such as composer metadata (321), DM metadata (319), and graphics data (e.g., alpha blend values) (317).

Since received video data (AVC1, AVC2) may be in a format not directly supported for display (e.g., 12-bit YCbCr 4:2:2), depending on the capabilities of the TV, format converters (320) may convert the video data back into another format (e.g., 8-bit YCbCr 4:2:0). For example, 12-bit data may be transformed first to 8-bit data by shifting the data to the right to delete the four least significant bits. Then, the chroma components of the YCbCr 4:2:2 signals may be down-sampled to generate a YCbCr 4:2:0 signal. Composer (325) is similar to composer (125) described earlier. It combines base layer (e.g., AVC1) and enhancement layer (e.g., AVC2) signals into an EDR video signal (327), as specified by the composer metadata (321).

Following the composer operation (325), a display management process (330) (e.g., as the one described earlier or as described in the '104 Application) optimizes the appearance of video signal (327) to generate video output (332) that best matches the display characteristics (e.g., gamut and brightness levels) of the TV's panel (350). TV processor (335) may perform additional processing to video signal (332) (e.g., frame rate conversion, spatial scaling, and the like) to generate video output (337). Input graphics (314) are processed as needed by graphics processor (345) to generate processed graphics data (347). For example, graphics processing (345) may include a format conversion to convert graphics data from the input 12-bit YCbCr 4:2:2 format to a format suitable for the target display (e.g., 8-bit YCbCr 4:4:4 or RGB 4:4:4). Using blender (340), video (337) and graphics data (347) are blended together to generate the final output video signal (342) to be displayed on the TV's panel (350).

Second Embodiment of Simplified Media Receiver

Figure 2B:
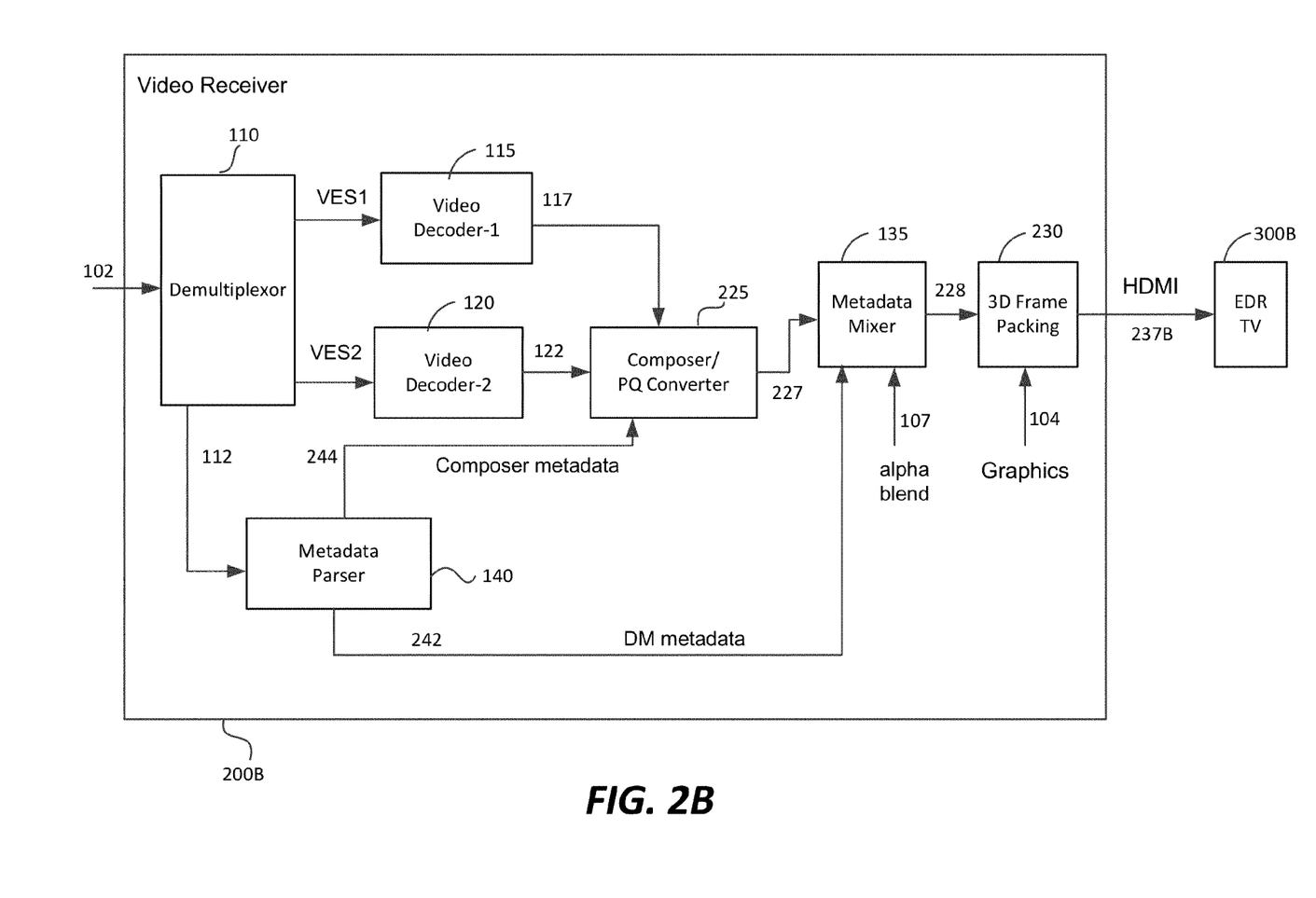

FIG. 2B depicts a second embodiment of a simplified EDR video receiver. As depicted in FIG. 2B, the main differences between the (100), (200A), and (200B) receivers are the following: As in system (100), compositing of the two video layers (e.g., 117 and 122) in to a single EDR signal is also performed in system (200B) by composer (225), which has similar functionality as composer (125). Hence, unlike system (200A), system (200B) does not require the two format converters (205-1, 205-2) or the interleaver (220). Furthermore, in system (200B), there is no need to transmit the composer metadata (244) to the TV (300B). Thus, in terms of computational complexity, system (200B) is simpler than system (100) but more complex than system (200A).

Composer (225) in system (200B) may also integrate an optional perceptual quantizer (PQ) which operates on the EDR data and convers the output of the composer (e.g., 125) from the traditional gamma domain to a more suitable perceptual-quantization domain. An example of such a PQ quantizer is described in PCT Application Ser. No. PCT/US2012/068212, filed on Dec. 6, 2012, "Device and method of improving the perceptual luminance nonlinearity-based image data exchange across different display capabilities," by J. S. Miller, et al., which is incorporated herein by reference in its entirety.

Both systems (200A) and (200B) include a metadata multiplexer (135) to multiplex, as described earlier, video data (e.g., 227) with DM metadata (242) and alpha blend data (107) in a format suitable for transmission over a communication interface, such as HDMI. In addition to the metadata multiplexer (135), receiver (200B) includes a 3D Frame Packing processing unit (230). The purpose of the 3D Frame Packing processor (230) is to combine and reformat the 2D EDR video data (228) and the input graphics (104) to appear as "3D data" suitable for transmission over the communication interface (237B).

Figure 4:
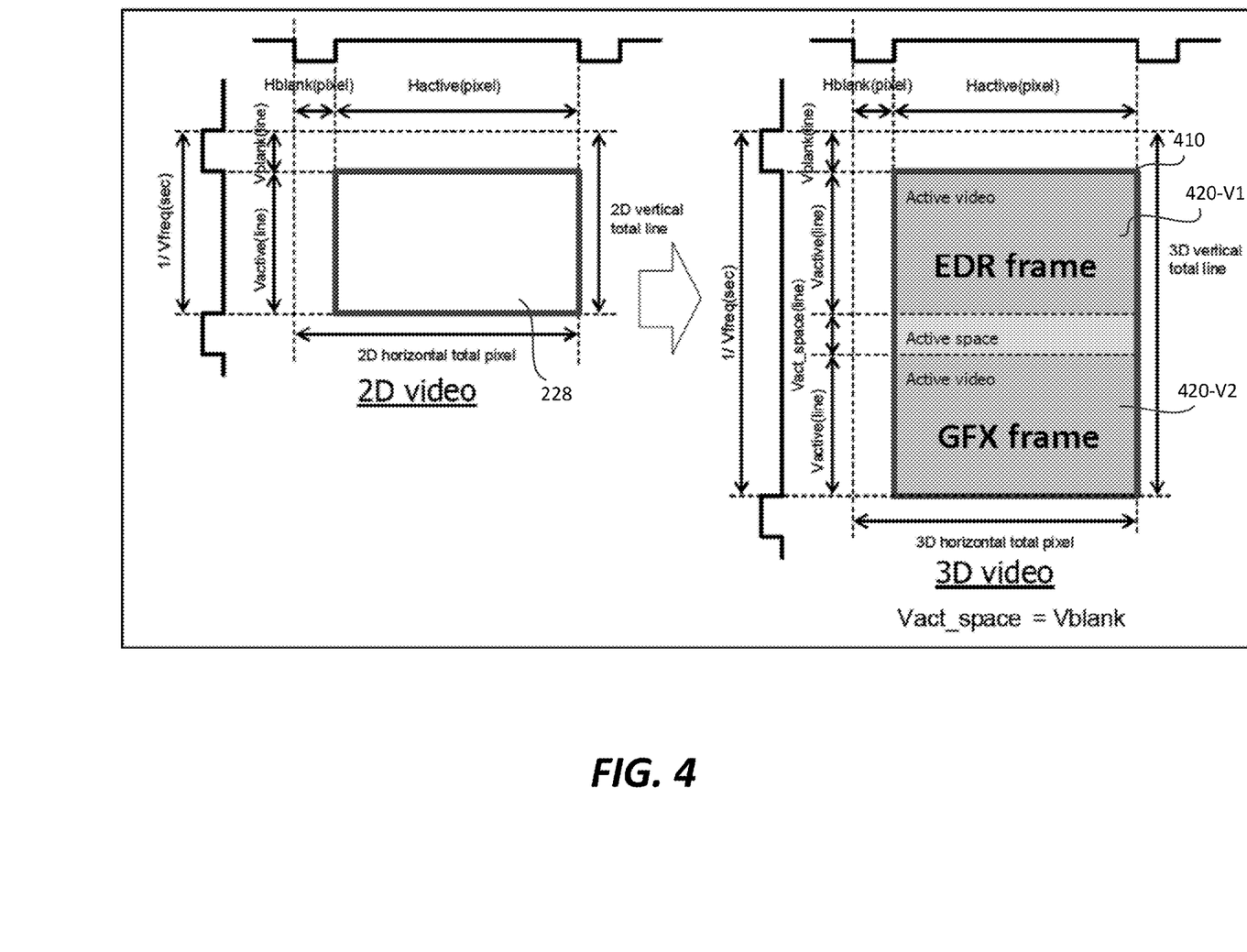
FIG. 4 depicts an example 3D frame packing technique for 2D EDR video and graphics transmission according to an embodiment of the present invention.

FIG. 4 depicts an example of 3D Frame packing format according to an embodiment. This format is compatible with the HDMI 3D format for progressive video as described in the "High-definition multimedia interface," specification version 1.4b, Oct. 11, 2011, by HDMI Licensing, LLC. In traditional 3D transmission, a 3D video signal (410) includes two separate views: a left view (e.g., 420-V1) and a right view (e.g., 420-V2). In an embodiment, the left view signal (420-V1) may comprise the blended EDR data (228). Instead of transmitting a second view with video data, the data of the second view (e.g., 420-V2) may comprise the input graphics data (104). The proposed format allows video receiving system (200B) to transmit to TV (300B) all the information required to display an EDR-compatible signal: the EDR video data (227), display management metadata (242), alpha blend data (107), and graphics (104). In an embodiment, output HDMI signal (237B) may be in RGB 4:4:4 format, EDR signal (420-V1, 228) may originally be in YCbCr 4:2:2 format, but mixed to appear as RGB 4:4:4 (see earlier discussion and the '080 and '026 Applications), and the graphics signal (420-V2) may be in RGB 4:4:4 color format. Appropriate color and format conversions (not shown) may be applied to transform the video and graphics signals in (200B) from one color format to another as necessary.

Figure 3B:
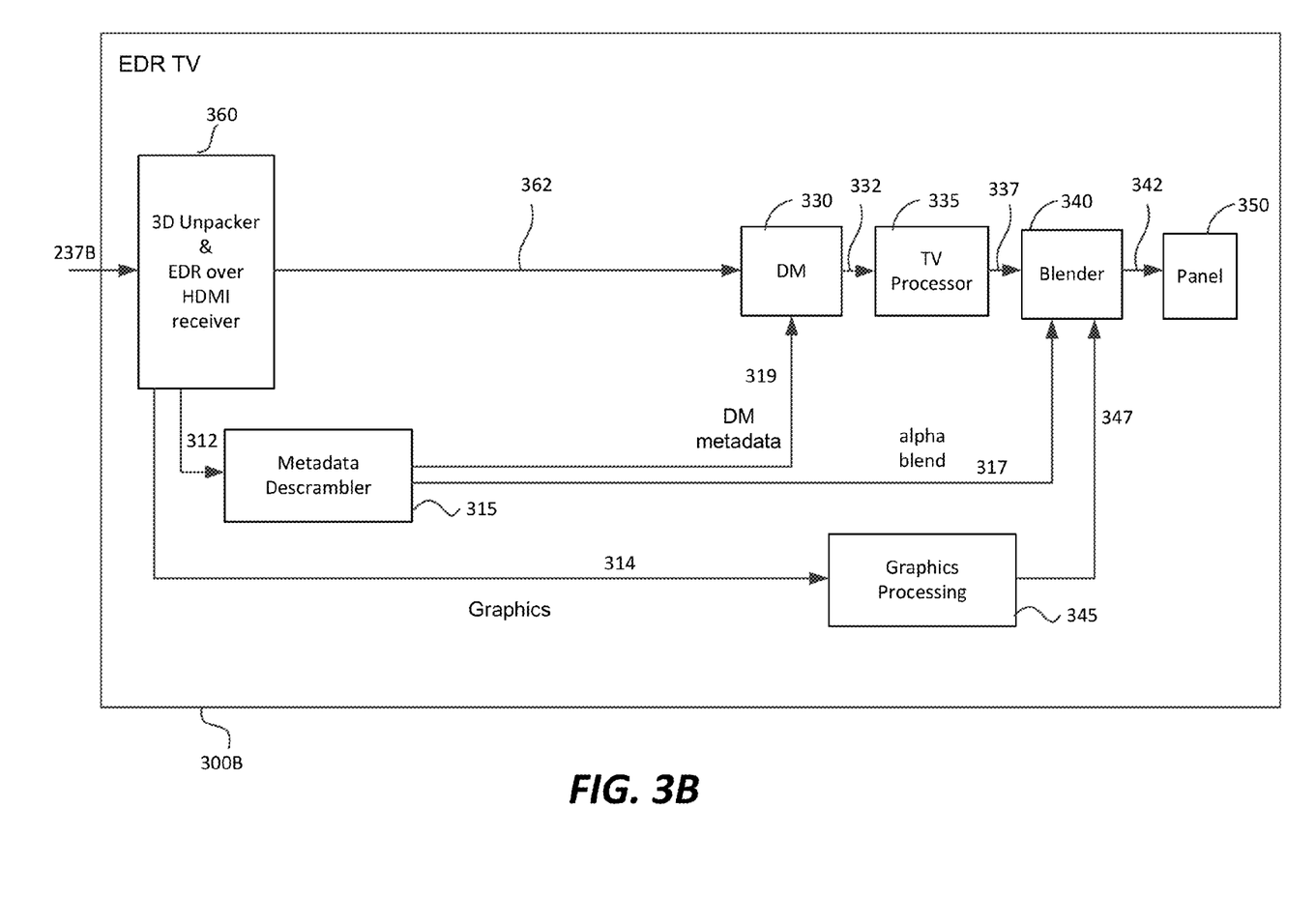

FIG. 3B depicts a block diagram of an EDR TV (300B) suitable to receive, decode, and display an EDR signal (237B) transmitted by video receiver (200B). System (300B) is very similar to system (300A), except for two features: a) it does not require the two format converters (320) and the composer (325), since all composing is performed in the receiver (200B) and b) instead of a frame de-interleaver it uses a 3D frame decoder. Hence, in terms of processing complexity, EDR TV (300B) is simpler than EDR TV (300A).

Incoming signal (237B) is processed by 3D unpacker and HDMI receiver (360) which has two roles: a) to unpack the incoming 3D video into the two "views" and b) to identify whether the incoming signal is a traditional 3D signal with two separate views, or a 2D EDR signal with one video view (e.g. 228), display management metadata (242, 319), graphics view (104, 314), and graphics alpha blend data (107, 317). If the input signal is a 2D EDR signal, then the associated metadata (312) are also extracted and passed to the metadata descrambler (315) as explained earlier.

As described in the '026 and '080 Applications, after video data and the corresponding metadata are blended, then, on the corresponding EDR over HDMI receiver, a simple cyclic redundancy check (CRC) can identify whether the incoming HDMI data includes hidden EDR metadata. In an embodiment, without limitation, 3D unpacker (360) may use the same CRC check on the received 2D data (228) to help identify whether the data is 2D EDR or 3D SDR. If the CRC test does not fail, then the data comprise 2D EDR data (362), which are passed to the display management processor (330). Received metadata and graphics are also passed to the metadata descrambler (315), which generates alpha blend data (317), and the graphics processor (345). Given video data (362), metadata (312), and graphics data (314), the remaining processing in (300B) is similar to the processing of EDR data in EDR TV (300A) as described earlier. Video and graphics signals may be further transformed from one color format to another as needed. If the video receiver (200B) applied a PQ converter to the EDR signal (227), then the inverse PQ operations may be performed as part of the display management processing (330).

Practitioners skilled in the art will appreciate that while example embodiments utilize the HDMI interface, the methods and systems discussed herein are applicable to media receivers and television sets that may communicate with alternative wired or wireless interfaces.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to decoding and display of EDR images, such as those described herein. The computer and/or IC may compute any of a variety of parameters or values that relate to decoding and display of EDR images, as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to decoding and display of EDR images as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient decoding and display of EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for decoding and displaying enhanced dynamic range (EDR) images, the system comprising:
   a video receiver, the video receiver comprising one or more processors to perform decoding operations, the decoding operations comprising:
   receiving a layered coded video stream comprising a first coded video stream, a second coded video stream, and metadata;
   decoding the first coded video stream to generate a decoded first video signal in a first video format;
   decoding the second video stream to generate a decoded second video signal in a second video format;
   receiving graphics data in a third video format;
   converting the decoded first video signal from the first video format to a formatted first video signal in a fourth video format;
   converting the decoded second video signal from the second video format to a formatted second video signal in the fourth video format;
   converting the graphics data in the third video format to formatted graphics data in the fourth video format;
   interleaving the formatted first video signal, the formatted second video signal, and the formatted graphics data to generate an interleaved video signal;
   embedding the metadata to the interleaved video signal to generate an output signal; and
   transmitting the output signal to a display.

2. The system of claim 1, wherein the decoding operations further comprise:
   extracting alpha blend data from the received graphics data; and
   embedding the alpha blend data to the interleaved video signal.

3. The system of claim 1, wherein decoding the first and second coded video streams is performed by an AVC decoder.

4. The system of claim 1, wherein the first and second video formats comprise an 8-bit YCbCr 4:2:0 format.

5. The system of claim 1, wherein the third video format comprises an 8-bit YCbCr 4:4:4 format.

6. The system of claim 1, wherein the fourth video format comprises a 12-bit YCbCr 4:2:2 format.

7. The system of claim 1, wherein the metadata are embedded to the interleaved video data as LSB data in the chroma pixel components of the video data.

8. The system of claim 1, wherein the output signal is transmitted as 12-bit YCbCr 4:2:2 or 8-bit RGB 4:4:4 HDMI-compliant signal.

9. A method to decode EDR data in a digital media player, the method comprising:
   receiving a layered coded video stream comprising a first coded video stream, a second coded video stream, and metadata;
   decoding the first coded video stream to generate a decoded first video signal in a first video format;
   decoding the second video stream to generate a decoded second video signal in a second video format;
   receiving graphics data in a third video format;
   converting the decoded first video signal from the first video format to a formatted first video signal in a fourth video format;
   converting the decoded second video signal from the second video format to a formatted second video signal in the fourth video format;
   converting the graphics data in the third video format to formatted graphics data in the fourth video format;
   interleaving the formatted first video signal, the formatted second video signal, and the formatted graphics data to generate an interleaved video signal;
   embedding the metadata to the interleaved video signal to generate an output signal; and
   transmitting the output signal to a display.

10. The method of claim 9, wherein the first and second video formats comprise an 8-bit YCbCr 4:2:0 format.

11. The method of claim 9, wherein the third video format comprises an 8-bit YCbCr 4:4:4 format.

12. The method of claim 9, wherein the fourth video format comprises a 12-bit YCbCr 4:2:2 format.

13. The method of claim 9, wherein the metadata are embedded to the interleaved video data as LSB data in the chroma pixel components of the video data.

14. The method of claim 9, wherein the output signal is transmitted as 12-bit YCbCr 4:2:2 or 8-bit RGB 4:4:4 HDMI-compliant signal.

15. The method of claim 9 wherein the output signal is transmitted at 60 frames per second (fps), wherein 24 fps are allocated to each of the formatted first and second video signals and 12 fps are allocated to the formatted graphics data.

16. A non-transitory computer-readable storage medium having stored thereon computer-executable instructions for executing a method with a computer in accordance with claim 9.

* * * * *